Dec. 24, 1968  H. J. BIESCHKE  3,417,952
TRIPOD LOCK FOR MOVIE SCREEN STAND
Filed Aug. 15, 1966  2 Sheets-Sheet 2
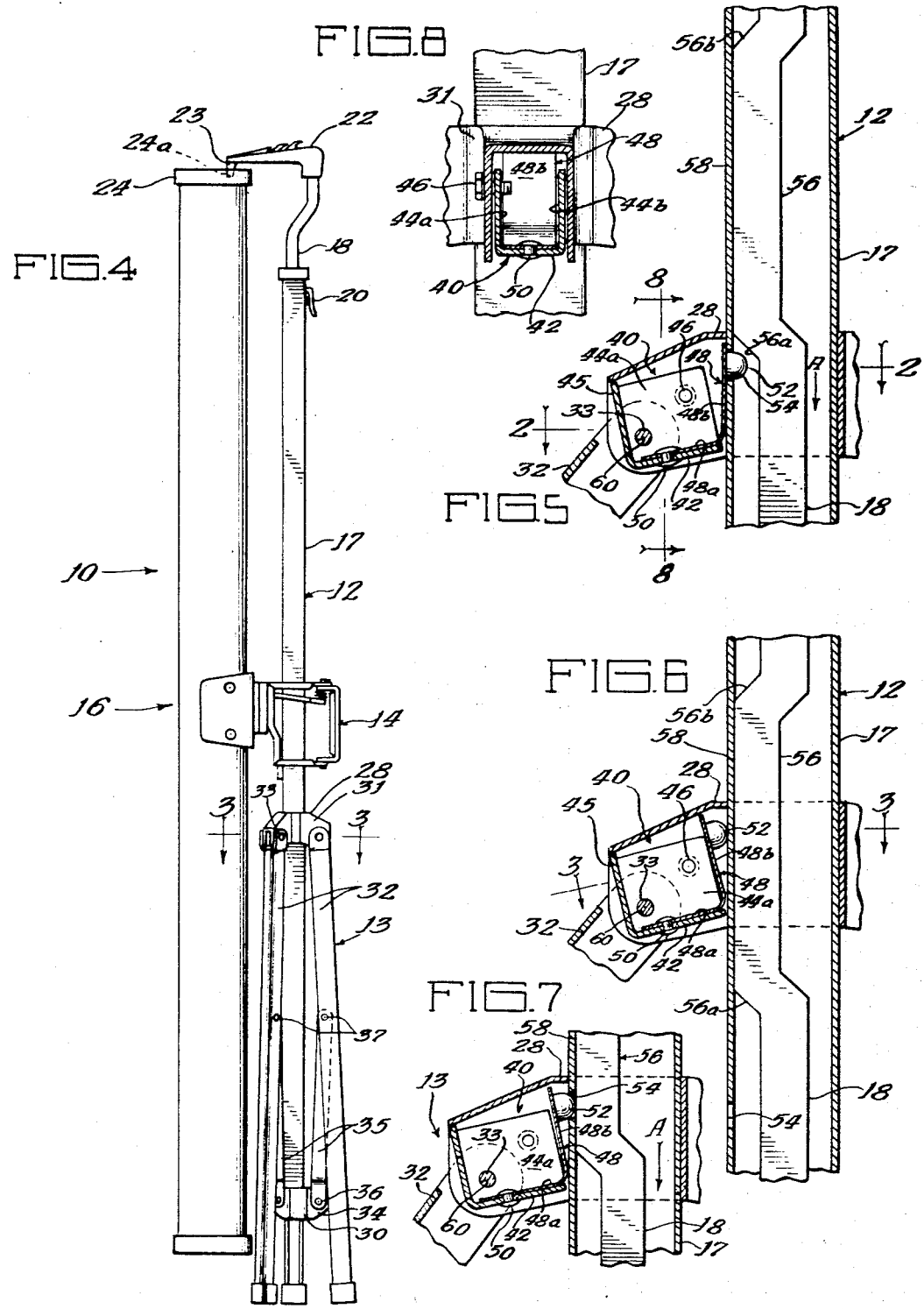

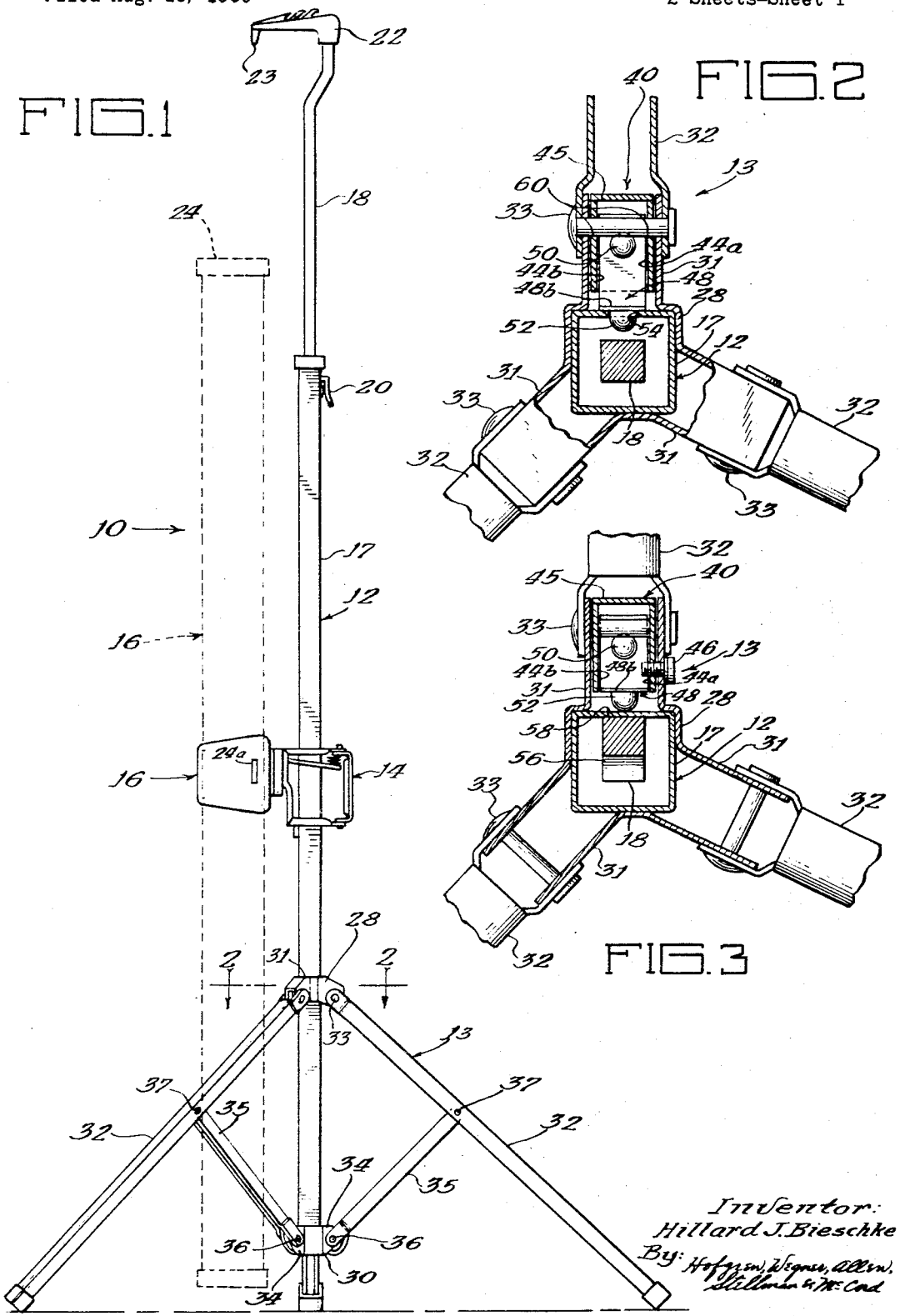

United States Patent Office 3,417,952
Patented Dec. 24, 1968

3,417,952
TRIPOD LOCK FOR MOVIE SCREEN STAND
Hillard J. Bieschke, Itasca, Ill., assignor to Knox Manufacturing Company, a corporation of Illinois
Filed Aug. 15, 1966, Ser. No. 572,532
3 Claims. (Cl. 248—171)

ABSTRACT OF THE DISCLOSURE

Arrangement for holding a swingable leg unit of a movie screen stand in a spread supporting position, the stand having a telescoping rod in the leg unit swingably connected to a collar slidably mounted on the lower end of the standard, characterized in that the collar carries a spring-urged plunger normally urged inwardly of the standard and the standard is provided with an opening in the sidewall thereof, the opening being positioned for occupation by the plunger of the collar when the leg is in a spread supporting position, with the telescoping rod having a camming portion positioned to force the plunger outwardly of the opening when the rod is depressed inwardly of the stand.

---

This invention relates to a portable movie screen structure and more particularly to an improvement in the collapsible tripod utilized with the portable movie screen stand, the improvement comprising a locking device associated with the tripod structure for maintaining the tripod in a spread supporting position.

Movie screen stands are usually provided with a tripod-type leg structure at the lower end of the stand for supporting the stand upright when the movie screen device is in use. The tripod structure is usually collapsible so that when the screen is not in use, the leg unit may be folded to a collapsed position adjacent the standard for convenience of storage and portability. One such common arrangement for the tripod structure is to have a collar slidably mounted on the standard to which the legs of the tripod unit are pivoted. Bracing links may be pivoted to the lower end of the standard and also pivoted to the medial portions of the legs. When the leg unit is swung to the spread supporting position the collar slides downwardly relative to the standard and, conversely, the collar slides upwardly when the legs of the tripod are swung inwardly to the collapsed position adjacent the standard.

It is not uncommon in this type of a tripod structure for the tripod to tend to retract inwardly towards the standard of its own accord responsive to slight jarring or vibration either of the standard or of the floor area adjacent the tripod. Such jarring or vibration will cause the slidable collar to move upwardly on the standard, thus drawing the legs inwardly. After a prolonged period of time, the leg unit may be drawn sufficiently closely adjacent the standard to render the structure unstable so that it may ultimately tip or fall of its own accord.

This invention is directed, in brief, to a locking means for retaining the leg unit in a spread supporting position. The locking means includes mutually cooperable elements on the standard and on the slidable collar of the leg unit. Furthermore, the locking means is intended to be automatically disengageable when the telescoping rod is depressed inwardly of the standard during the process of placing the movie screen unit in a portable or storage condition. In particular, the slidable collar of the leg unit is provided with a plunger normally urged inwardly of the standard. The standard has an opening at the lower end in the area usually occupied by the collar when the legs are in the spread supporting position. The telescoping rod has a cam surface positioned to engage the plunger and force it outwardly of the opening when the rod is depressed inwardly of the standard.

The primary object of this invention is to provide an improvement in the tripod structure of a movie screen stand.

It is another object of this invention to provide a means for locking the tripod-type supporting unit in the spread supporting position.

A further object of this invention is to provide a locking means for locking the collapsible supporting legs of a movie screen stand in the spread supporting position, the locking means being automatically disengageable responsive to movement of other components for placing the movie screen stand in a storage condition.

Yet a further object of this invention is to provide a locking means for the collapsible leg unit of a movie screen stand for retaining the leg unit in a spread supporting position, the locking means being automatically disengageable responsive to depression of the telescoping rod inwardly of the standard to permit movement of the leg unit to the collapsed position adjacent the standard.

Other objects, features and advantages of the present invention will be apparent from the following description of the preferred embodiments illustrated in the accompanying drawings, in which:

FIGURE 1 is a side elevational view of a movie screen device with the leg assembly or leg unit in a spread supporting position, the telescoping rod extended outwardly of the standard and the movie screen casing swung from the dotted line position 90° to the full line position perpendicular to the standard as shown, wherein the screen may be withdrawn from the casing and secured to the free end of the telescoping rod;

FIGURE 2 is an enlarged fragmentary sectional view taken along the line 2—2 of FIGURE 1 showing the locking unit in the slidable collar of the leg unit engaging an opening in the side wall of a movie screen standard to hold the tripod-type leg structure in a spread supporting position;

FIGURE 3 is a view similar to FIGURE 2 but showing the lock member retracted from the opening in the standard and bearing against the side wall of the standard permitting free movement of the slidable collar axially of the standard;

FIGURE 4 is a side elevational view of the movie screen device shown in FIGURE 1 with the leg assembly or leg unit in a closed position and the screen casing also held in closed position parallel to the standard by engagement with the retracted telescoping rod;

FIGURE 5 is a fragmentary enlarged sectional view of the lower portion of the movie screen standard showing the locking device for the tripod-leg structure engaging the opening in the side wall of the movie screen standard;

FIGURE 6 is a view similar to FIGURE 5 but showing the lock member retracted from the opening and the collar on which the lock member is mounted moved axially upwardly of the standard away from the opening;

FIGURE 7 is a view similar to FIGURE 5 but showing the cam action of the offset of the telescoping rod which pushes the plunger of the lock member outwardly of the opening in the side wall of the standard to permit disengagement of the collar from the standard; and FIGURE 8 is a fragmentary enlarged sectional view taken along the line 8—8 of FIGURE 5.

The movie screen device 10 includes a standard generally indicated 12 adapted for support in an upright position preferably by a tripod-type leg unit, generally designated 13. The standard carries a handle member generally designated 14, which is slidably mounted on the standard and provided with a means for adjustably positioning the handle member 14 vertically of the standard 12.

The forward face of the handle member 14 provides a mounting surface to which a conventional screen casing, generally designated 16, is pivotally mounted. The casing 16 is swingably mounted on the handle, one mounting means illustrated in the Petrick et al. Patent No. 3,022,816, entitled, "Portable Movie Screen," issued Feb. 27, 1962, wherein the screen casing 16 when released from its carrying position parallel to the standard (as shown in FIGURE 4), automatically pivots 90° to its operative position perpendicular to the standard, as shown in FIGURE 1.

The standard 12 includes a main tubular member 17 and a telescoping rod 18 slidably received in the tubular member. A conventional clamping member 20 is provided at the upper end of the standard for holding the telescoping rod in different positions of extended adjustment relative to the tubular member 17. Preferably the clamping member 20 is spring biased so that it is normally held in clamping position and must be manually released to adjust the telescoping rod 18. The upper end of the rod 18 carries a bail support 22 from which the free end of the movie screen is supported in a conventional manner. The bail support is provided with a depending lug 23 of a size to fit within a well 24a in the end cap 24 of screen casing 16 to hold the casing 16 in a carrying position or storage position parallel to the standard as shown in FIGURE 4.

Leg unit 13 is provided with an upper collar 28 which slidably embraces the lower end portion of tubular member 17. A lower collar 30 is fixed to the lower end of the standard. Upper collar 28 is provided with three pairs of spaced ears 31 and a channel-shaped leg member 32 is swingably mounted to each pair of ears 31 by suitable means such as a rivet 33.

The lower collar 30 is provided with three pairs of spaced ears 34 (only two being shown) and a channel-shaped bracing link 35 is pivoted at one end to each pair of ears 34 by means such as a rivet 36 and at the opposite end each bracing link is pivotally secured to a medial portion of a corresponding leg member 32 by suitable means such as a rivet 37.

Portions of the leg unit 13 thus far described are conventional. When the leg unit 13 is swung toward closed position adjacent the standard 12, the slidable upper collar 28 moves upwardly on the tubular member 17 to the position shown in FIGURE 4 and the leg members 32 and bracing links 35 swing inwardly about the pivot connections afforded by the rivets 31, 36 and 37. Conversely, when the leg unit 13 is moved to a spread supporting position as shown in FIGURE 1, the upper collar 28 slides downwardly relative to the tubular member 17 and the leg members 32 and bracing links 35 pivot outwardly.

In the present invention, means are provided associated with the leg unit 13 and, in particular, with the slidable collar 28, for holding the leg unit in the spread supporting position and preventing the collar 28 from sliding upwardly relative to the standard. In addition, this means is automatically releasable responsive to retraction of the telescoping rod 18 inwardly of the standard preparatory to placing the movie screen stand in a carrying or storage condition.

To this end, bracket means 40 is provided for holding a locking element in the slidable collar. Bracket 40 is in the preferred embodiment shown as a generally U-shaped member, including a base 42 and a pair of upright ears 44a and 44b which are matingly received within the ears 31 of the slidable collar 28. Bracket 40 may also include an upwardly bent rear wall 45 which serves to substantially enclose the bracket. The bracket may be secured to the interior of one of the spaced ears 31 in a suitable manner, and in the preferred embodiment, a fastening element 46 is shown which extends through the ear 31 and through one of the ears 44a of the bracket 40 for the purpose.

Bracket 40 supports a means for normally urging a locking element into engagement with the tubular housing 17. In the preferred embodiment, this urging means is a leaf spring 48 which is generally bent into an L shape so as to provide a base portion 48a juxtaposed against the base 42 of bracket 40 and an upright leg portion 48b which bears against the face of tubular housing 17. Suitable fastening means, such as rivet 50 are utilized to secure the spring 48 to the base portion of bracket 40.

The free upper end of portion 48b of leaf spring 48 is provided with a locking element in the form of a bulbous enlargement, plunger, or knob 52 intended to engage an opening 54 formed in the lower end of the tubular housing 17 at a position such as to maintain the tripod-type leg structure in a desired spread-supporting position when the collar 28 occupies the area of the housing 17 adjacent the opening with the element 52 engaging the opening and locking the collar against movement relative to the standard. Such a position is generally shown in FIGURE 1 wherein the leg unit is in the supporting position and the telescoping member extended.

As best seen in FIGURES 2 and 3, each of the ears 31 is generally positioned approximately 120° apart about the four-sided tubular housing 17. In order to maintain the desired spacing and in order that the casing 16 may be swung from its position as shown in FIGURE 4 parallel to the standard to its position shown in FIGURE 1 in full outline perpendicular to the standard, one of the ears 31 is generally positioned so as to extend perpendicular relative to one of the faces of the tubular housing 17, the remaining ears being angularly disposed relative to the faces of the housing. In the preferred embodiment, the bracket 40 which supports locking element 52 and leaf spring 48 has been shown as being mounted in that ear which is perpendicular to one of the faces of the tubular standard 17. It is to be understood that the invention is not necessarily limited to such a structure and will be readily appreciated that the cooperating locking means could be provided in one of the other ears of the slidable collar. However, for purposes of simplicity of structure and ease of assembly, it is felt the arrangement shown and described herein wherein the leaf spring and locking element facially engage a flat face of the tubular housing 17 is the best mode presently known for carrying out this invention.

Means are provided for releasing or disengaging the knob 52 from opening 54 in the standard, such means being actuable automatically upon retraction of the telescoping rod 18 inwardly of the standard, a normal function associated with placing the stand in a portable or storage condition as shown in FIGURE 4. This means includes a member operably associated with the rod 18 for movement therewith and preferably takes the form of an offset 56 formed in the telescoping rod 18, this offset providing biasing or camming surfaces 56a and 56b and a flat facial surface 58 which facially engages the interior of the flat face of tubular standard 17 in which opening 54 is found.

In operation, to set the standard up for use to the position shown in FIGURE 1 from the position shown in FIGURE 4, the telescoping rod 18 is extended so as to draw the offset portion 56 upwardly past opening 54. The screen casing 16 is pivoted relative to its mounting on the forward face of handle 14 and the tripod-type leg structure is permitted to descend to the spread-supporting position by movement of collar 28 downwardly relative to the standard. The collar may be slid to a point where knob 52 is aligned with opening 54, at which point the spring force of spring 48 will cause the knob to automatically enter opening 54, thereby locking the collar against movement relative to the standard. By being so locked, the collar is not only prevented from moving, but the remaining components of the leg unit are also prevented from either spreading further outwardly or creeping inwardly relative to the standard. Thus the leg unit is held substantially rigid against vibrations, jarrings and the like.

When the use of the movie screen has terminated and it is desired to place the movie screen into the carrying position as shown in FIGURE 4, the telescoping rod is inserted inwardly of the standard after the screen casing 16 has been pivoted to the parallel position shown in full outline in FIGURE 4 and in dotted outline in FIGURE 1. Retraction of the telescoping rod inwardly permits the depending lug 23 to occupy the corresponding locking surface 24a in the end of the screen casing to hold the casing against movement relative to the standard. This is a normal step in placing a screen casing in a storage or carrying condition.

The offset 56 is located at a point along the length of the telescoping rod 18 such that when the rod is retracted fully inwardly as shown in FIGURE 4 to a position where the depending lug performs its locking function, the flat face portion 58 of the rod will occupy, and lie against, that portion of the tubular standard 17 wherein the opening 54 is found. In the action of so retracting the telescoping rod 18, cam surface 56a, moving downwardly in the direction indicated by the arrow A in FIGURE 5, forces knob 52 outwardly as shown in FIGURE 7. The slidable collar then may be pulled upwardly, the rounded surface of the knob easily overcoming the small retarding influence of the sides of the thin-walled opening so that the collar may be slid upwardly of the standard to a position wherein the legs and the tripod are completely collapsed adjacent the standard.

The foregoing detailed description has been given for clearness of understanding only, and no unnecessary limitations should be understood therefrom, as some modifications may be obvious to those skilled in the art.

I claim:

1. In a stand having an elongated standard, a telescoping rod slidably mounted in the standard for movement between a retracted position and different positions of extension relative to the standard, the telescoping rod being substantially smaller than the interior of the standard so as to be generally spaced from the inner walls thereof, with clamp means provided for holding the rod in different positions of extension relative to the standard, and a collapsible leg unit for maintaining the stand in an upright position upon a supporting surface including a collar slidably mounted on the lower end of the standard for movement from a first leg unit collapsed position to a leg unit spread supporting position spaced from the first position, and a plurality of leg members swingably connected to the collar for movement between a closed position adjacent the standard when said collar is in the leg unit closed position and a spread supporting position when the collar is moved to the leg unit supporting position, means for holding the leg in said spread supporting position against movement relative to the standard, comprising: a plunger on said collar normally urged inwardly of the standard; an opening on the standard positioned in the area of the leg unit spread supporting position, the opening being of a size and shape to be occupied by the plunger when the collar is moved to said leg unit spread supporting position to thereby lock the collar against movement relative to the standard; and lock disengaging means on the rod, said lock disengaging means being an offset portion of the telescoping rod misaligned relative to the remaining portion of the rod; said offset portion projecting beyond the remainder of the rod to provide a limited surface area of the rod in facial abutment with the interior of the standard, said offset portion being connected to the remaining portion of the rod with a camming surface positioned to engage the plunger and to force the same outwardly of the opening as the rod is moved inwardly of the standard whereby the leg unit may be moved to the closed collapsed position adjacent to the standard.

2. The stand of claim 1 wherein the plunger is mounted to the face of a leaf spring, the leaf spring being fixed to the collar in abutment with the face of the standard so as to normally urge the plunger inwardly of the standard.

3. The stand of claim 2 wherein the leaf spring is connected to the base of an upwardly facing U-shaped bracket which is secured into the interior of the collar, the collar having outwardly extending and downwardly facing U-shaped ears, whereby the spring means and its mounting bracket are secured to the interior of the collar substantially masked from view.

References Cited

UNITED STATES PATENTS

| | | | |
|---|---|---|---|
| 664,678 | 12/1900 | Quinn | 248—171 |
| 2,386,450 | 10/1945 | Eller | 248—171 X |

ROY D. FRAZIER, *Primary Examiner.*

FRANK DOMOTOR, *Assistant Examiner.*

U.S. Cl. X.R.

248—188.6, 464